United States Patent
Park et al.

(10) Patent No.: US 7,355,729 B2
(45) Date of Patent: Apr. 8, 2008

(54) APPARATUS AND METHOD FOR MEASURING A THICKNESS OF A SUBSTRATE

(75) Inventors: Hwan-Shik Park, Seoul (KR); Sun-Yong Choi, Gyeonggi-do (KR); Chung-Sam Jun, Gyeonggi-do (KR); Kye-Weon Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 363 days.

(21) Appl. No.: 10/912,559

(22) Filed: Aug. 6, 2004

(65) Prior Publication Data

US 2005/0083539 A1      Apr. 21, 2005

(51) Int. Cl.
   *G01B 11/28* (2006.01)
(52) U.S. Cl. .............. 356/630; 356/609; 356/624; 250/559.27
(58) Field of Classification Search ............ None
   See application file for complete search history.

(56) References Cited

U.S. PATENT DOCUMENTS

| | | | | |
|---|---|---|---|---|
| 6,128,085 A * | 10/2000 | Buermann et al. | .......... | 356/369 |
| 6,271,921 B1 * | 8/2001 | Maris et al. | .......... | 356/630 |
| 6,353,473 B1 | 3/2002 | Ishimori et al. | .......... | 356/73 |
| 6,628,410 B2 * | 9/2003 | Doan | .......... | 356/630 |
| 6,710,890 B1 * | 3/2004 | Krishnan et al. | .......... | 356/630 |
| 6,795,193 B2 * | 9/2004 | Schulz | .......... | 356/445 |
| 6,925,860 B1 * | 8/2005 | Poris et al. | .......... | 73/105 |

FOREIGN PATENT DOCUMENTS

JP           8105716          4/1996
KR   1020030027457 A       4/2003

* cited by examiner

*Primary Examiner*—Layla G. Lauchman
*Assistant Examiner*—Juan D Valentin, II
(74) *Attorney, Agent, or Firm*—Volentine & Whitt, PLLC (57) ABSTRACT

An apparatus and method of measuring the thickness of a substrate. A first light is reflected from a standard sample having a known thickness. The light is concentrated through the light-focusing lens. The first light is converted into a first electrical signal by a detector responding to a light intensity of the concentrated first light. A second light is reflected from a substrate, and then is concentrated through the light-focusing lens. The second light is converted into a second electrical signal by the detector responding to a light intensity of the concentrated second light. An operating unit determines first and second peak values from the first and second electrical signals, respectively. The operating unit calculates the thickness of the substrate by using a standard distance corresponding to the first peak value, a moving distance of the substrate corresponding to the second peak value, and the known thickness of the standard sample.

19 Claims, 12 Drawing Sheets

APPARATUS AND METHOD FOR MEASURING A THICKNESS OF A SUBSTRATE

BACKGROUND OF THE INVENTION

1. Field of the Invention

Embodiments of the present invention relate to an apparatus and a method for measuring a thickness of a substrate. This application relies for priority upon Korean Patent Application No. 2003-55084 filed on Aug. 08, 2003, the content of which are herein incorporated by reference in its entirety.

2. Description of the Related Art

Monocrystalline silicon, which is a raw material for a semiconductor device, is formed into a cylindrical ingot through a Czochralski crystal growth method. The ingot of monocrystalline silicon is manufactured into silicon wafers through a series of wafer processes including a slicing process, an etching process, a cleaning process, and a polishing process. The silicon wafer can be used as a semiconductor substrate. A semiconductor device can be fabricated through a series of unit processes performed on the semiconductor substrate including a deposition process, a photolithography process, an etching process, an ion implanting process, or a chemical mechanical polishing process.

Various sizes of the silicon wafer (e.g. 6 inch, 8 inch, and 12 inch) may be utilized in fabricating semiconductor devices. As semiconductor technology evolves, the thickness of silicon wafers has been decreasing. For example, a 8 inch wafer has a thickness of about 755 µm, and a 12 inch wafer has a thickness of about 775 µm.

Measurement of wafer thickness can be important in the inspection process of a semiconductor device. Accuracy of measurements of wafer thickness should have an allowable error ±0.5 µm. A capacitive sensor may be used for measuring the wafer thickness. U.S. Pat. No. 6,353,473 (issued to Ishimori et. al.) discloses a measurement apparatus for measuring the wafer thickness including an optical heterodyne interferometer. However, the capacitive sensor can be limiting, because the wafer thickness can not be measured with constant density. Also, the measurement apparatus disclosed in U.S. Pat. No. 6,353,473 may be disadvantageous because both the measurement method and the structure of the apparatus are relatively complicated.

SUMMARY OF THE INVENTION

Embodiments of the present invention relate to a method and an apparatus for measuring thickness of a semiconductor substrate with simplicity and promptitude. According to aspects of embodiments of the present invention, an apparatus for measuring thickness of a substrate includes a sample stage, a substrate stage, a lighting unit, a light-focusing lens, a detector, a driving unit, and an operation unit.

The sample stage supports a standard sample (with a known thickness). The substrate stage supports a substrate. The sample stage includes a first upper surface for supporting the standard sample. The substrate stage includes a second upper surface for supporting the substrate. The first upper surface is arranged along a first direction (e.g. a horizontal direction substantially parallel with a bottom of the measuring apparatus) and the second upper surface is arranged along a second direction substantially perpendicular to the first direction, (e.g. a vertical direction penetrating the measuring apparatus). The second upper surface is positioned at substantially the same height as the first upper surface.

The light-focusing lens includes a light axis extending along the vertical direction. The light-focusing concentrates light reflected from an illuminated portion of the substrate, which is illuminated by the lighting unit, onto the detector. The detector detects the concentrated light through the light-focusing lens and the detected light is converted into electrical signals. The light-focusing lens concentrates the reflected first light reflected from the standard sample and the reflected second light reflected from the substrate. The detector detects the concentrated first and second lights, and the light intensity of the concentrated first and second lights are converted into first electrical signals and second electrical signals, respectively.

The lighting unit includes a light source for generating a light, a second light-focusing lens and a reflection mirror lens. The second light-focusing lens concentrates the light generated from the light source and has a second light axis substantially perpendicular to the first light axis. The reflection mirror is disposed at the intersection of the first and second light axes. The reflection mirror emits light concentrated through the second light-focusing lens onto a horizontal surface (including the first and second upper surfaces at) at a right angle.

The driving unit moves the substrate and the sample stages. The driving unit includes a first driver and a second driver. The first driver moves the substrate and the sample stages along the vertical direction to adjust a first distance between the standard sample and the first light-focusing lens and to adjust a second distance between the substrate and the light-focusing lens. The second driver moves the substrate and the sample stages along the horizontal direction such that the light exiting from the lighting unit is selectively emitted onto the standard sample or onto the substrate.

The operating unit determines a first peak value from the first electrical signal as it is varied in response to the adjustment of the first distance. The operating unit also determines a second peak value from the second electrical signal as it is varied in response to the adjustment of second distance. The operating unit also calculates the thickness of the substrate by comparing a standard distance corresponding to the first peak value between the standard sample and the first light-focusing lens comparing the second distance of the substrate corresponding to the second peak value, and comparing the known thickness of the standard sample.

Aspects of embodiments of the present invention relate to a method of measuring the thickness of a substrate. A first light is emitted to a standard sample having a known thickness. Then, the first light is reflected from the standard sample and concentrated through a light-focusing lens. A first electrical signal is then generated corresponding to light intensity of the reflected first light. The first distance is adjusted between the standard sample and the light-focusing lens. A first peak value is determined from the first electrical signal varied in response with changes to the first distance. A second light is emitted to a substrate and reflected from the substrate. The second light is concentrated through a light-focusing lens. A second electrical signal is generated corresponding to light intensity of the reflected second light. A second distance is adjusted between the substrate and the light-focusing lens. A second peak value is determined from the second electrical signal varied in response to the adjustment of the second distance. The thickness of the substrate is calculated by using a standard distance corresponding to the first peak value between the standard sample and the light-focusing lens, a moving distance of the substrate corresponding to the second peak value, and a thickness of the standard sample.

According to embodiments of the present invention, the thickness of the semiconductor substrate may be easily and rapidly obtained by using the standard distance corresponding to the first peak value, the moving distance of the substrate corresponding to the second peak value, and the known thickness of the standard sample.

BRIEF DESCRIPTION OF THE DRAWINGS

Example

Example

Example

Example

Example

Example

DESCRIPTION OF THE EXEMPALRY EMBODIMENTS

The present invention now will be described more fully hereinafter with reference to the accompanying drawings, in which example embodiments of the present invention are shown.

Figure 1:
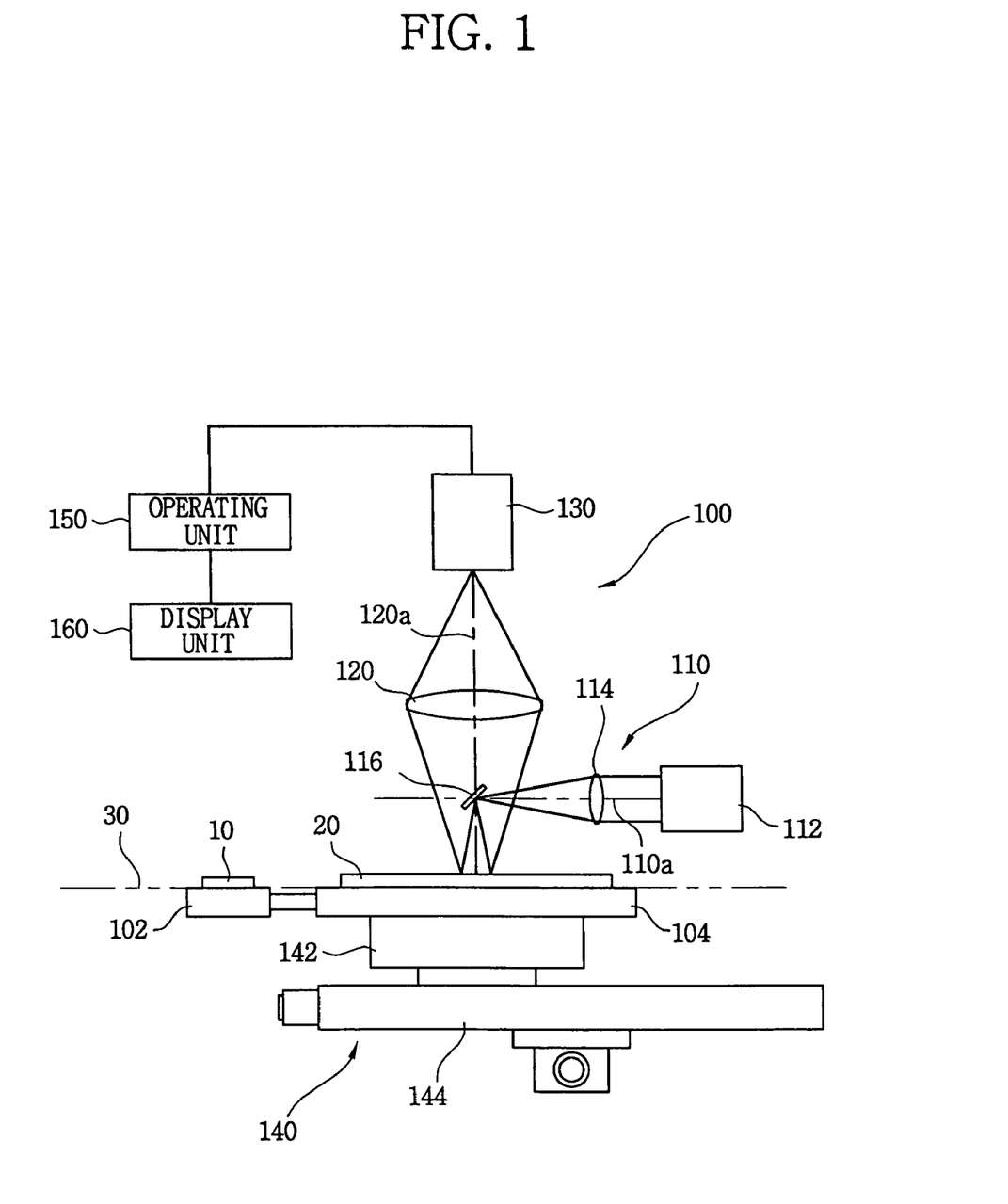
FIG. 1 is a schematic view illustrating a measurement apparatus for measuring a thickness of a semiconductor device.

Example FIG. 1 is a view schematically illustrating a measurement apparatus for measuring a thickness of a semiconductor device, according to example embodiments of the present invention. Example FIG. 2 is a perspective view illustrating a substrate stage and a sample stage.

Figure 2:
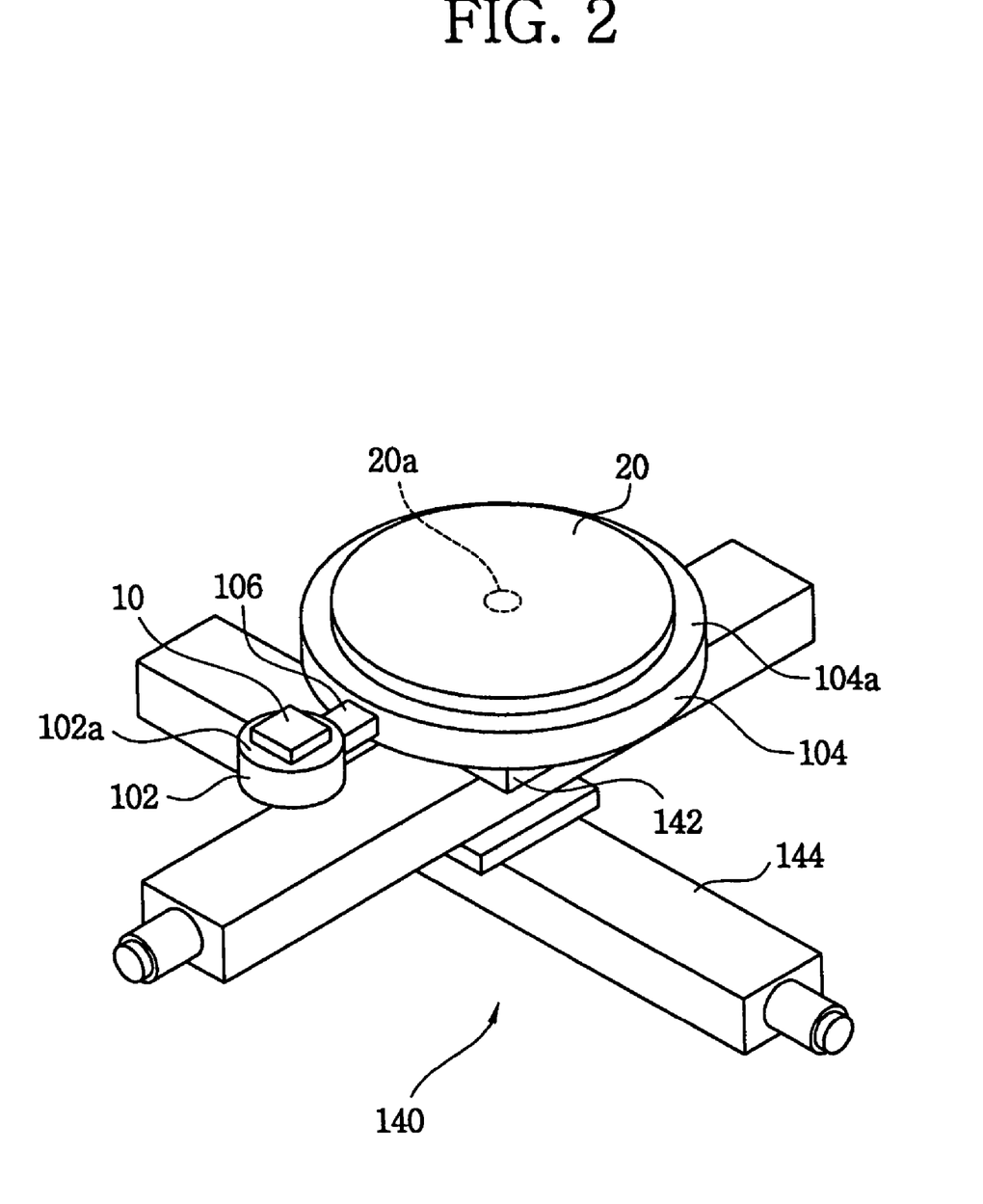
FIG. 2 is a perspective view illustrating a substrate stage and a sample stage.

Referring to example FIGS. 1 to 2, a measurement apparatus 100 (according to example embodiments) includes a sample stage 102, a substrate stage 104, a lighting unit 110, a first light-focusing lens 120, a detector 130, a driving unit 140, an operating unit 150, and a display unit 160. The sample stage 102 has a disk shape. A first upper surface 102a of the sample stage is disposed along a horizontal direction, substantially parallel with a bottom surface of the measurement apparatus 100. The substrate stage 104 has a disk shape with a diameter greater than that of the sample stage 102. The substrate stage 104 has a second upper surface 104a extending along the horizontal direction. The sample stage 102 is coupled to the substrate stage 104 by means of a connecting member 106. The first upper surface 102a is positioned at substantially the same height as the second upper surface 104a.

A substrate 20 is supported on the second upper surface 104a. A standard sample 10 with a known thickness is supported on the first upper surface 102a. In embodiments, a piece of a bare silicon wafer may be used as the standard sample 10 and the substrate 20 may be a semiconductor substrate of a bare silicon wafer.

The first light-focusing lens 120 has a first light axis 120a along a vertical direction (substantially perpendicular to the horizontal direction) is disposed on a horizontal surface 30 (including the first and second upper surfaces 102a and 104a).

The lighting unit 110 includes a light source 112, a second light-focusing lens 114 for concentrating the light generated from the light source 112, and a reflection mirror 116 for reflecting the light concentrated by the second light-focusing lens 114.

The second light-focusing lens 114 includes a second light axis 110a, substantially perpendicular to the first light axis 120a. The reflection mirror 116 is positioned at the intersection of the first and second light axes 120a and 110a. A portion of the concentrated light concentrated through the second light-focusing lens 114 is reflected from the reflection mirror 116 to the horizontal surface 30 and the remaining concentrated light is transmitted to the reflection mirror 116.

Light reflected from a lighting portion 20a by the lighting unit 110 is concentrated through the first light-focusing lens 120. The detector 130 (disposed on the first light-focusing lens 120) detects the light concentrated through the first light-focusing lens 120. The light concentrated through the first light-focusing lens 120 is converted into electrical signals.

The driving unit 140 (coupled to a lower portion of the substrate stage 104) moves the substrate stage 104 and the sample stages 102 along the horizontal or vertical direction. The driving unit 140 includes a first driver 142 (for moving the substrate stage 104 and the sample stage 102 along the vertical direction) and a second driver 144 (for moving the substrate stage 104 and the sample stage 102 along the horizontal direction). In embodiments, a piezoelectric stack including a plurality of piezoelectric elements may be used as the first driver 142 and a two dimensional Cartesian robot may be used as the second driver 144.

The second driver 144 moves the substrate stage 104 and the sample stage 102 so that the light generated from the lighting unit 110 is selectively emitted onto to the standard sample 10 and the substrate 20. The first driver 142 adjusts a first distance between an upper surface of the standard sample 10 and the first light-focusing lens 120, while the light generated from the lighting unit 110 is emitted to the standard sample 10. The first driver 142 also regulates a second distance between an upper surface of the substrate 20 and the first light-focusing lens 120 while the light generated from the lighting unit 110 is emitted to the substrate 20.

A first light reflected from the standard sample 10 is concentrated through the first light-focusing lens 120 and is then detected by the detector 130. The first light is then converted into a first electrical signal in response to the intensity of the first light. The first electrical signal is transmitted to the operating unit 150. The first electrical signal varies in response to changes of the first distance adjusted by the first driver 142. The operating unit 150 determines a first peak value of the first electrical signal.

A second light reflected from the substrate 20 is concentrated by the first light-focusing lens 120 onto the detector 130. Subsequently, the second light is converted into a second electrical signal in response to the intensity of the second light. The second electrical signal is transmitted to the operating unit 150. The second electrical signal changes responsive to changes in the second distance (adjusted by the first driver 142). The operating unit 150 determines a second peak value of the second electrical signal.

The operating unit 150 calculates the thickness of the substrate by using the distance (between the upper surface of the standard sample 10 and the first light-focusing lens 120, corresponding to the first peak value) by a vertical distance (along which the substrate 20 corresponding to the second peak value has vertically passed), and by the known thickness of the standard sample 10. The display 160 is connected to the operating unit 150 and displays the calculated thickness of the substrate 20 and the position of the lighting portion 20a.

Figure 3A:
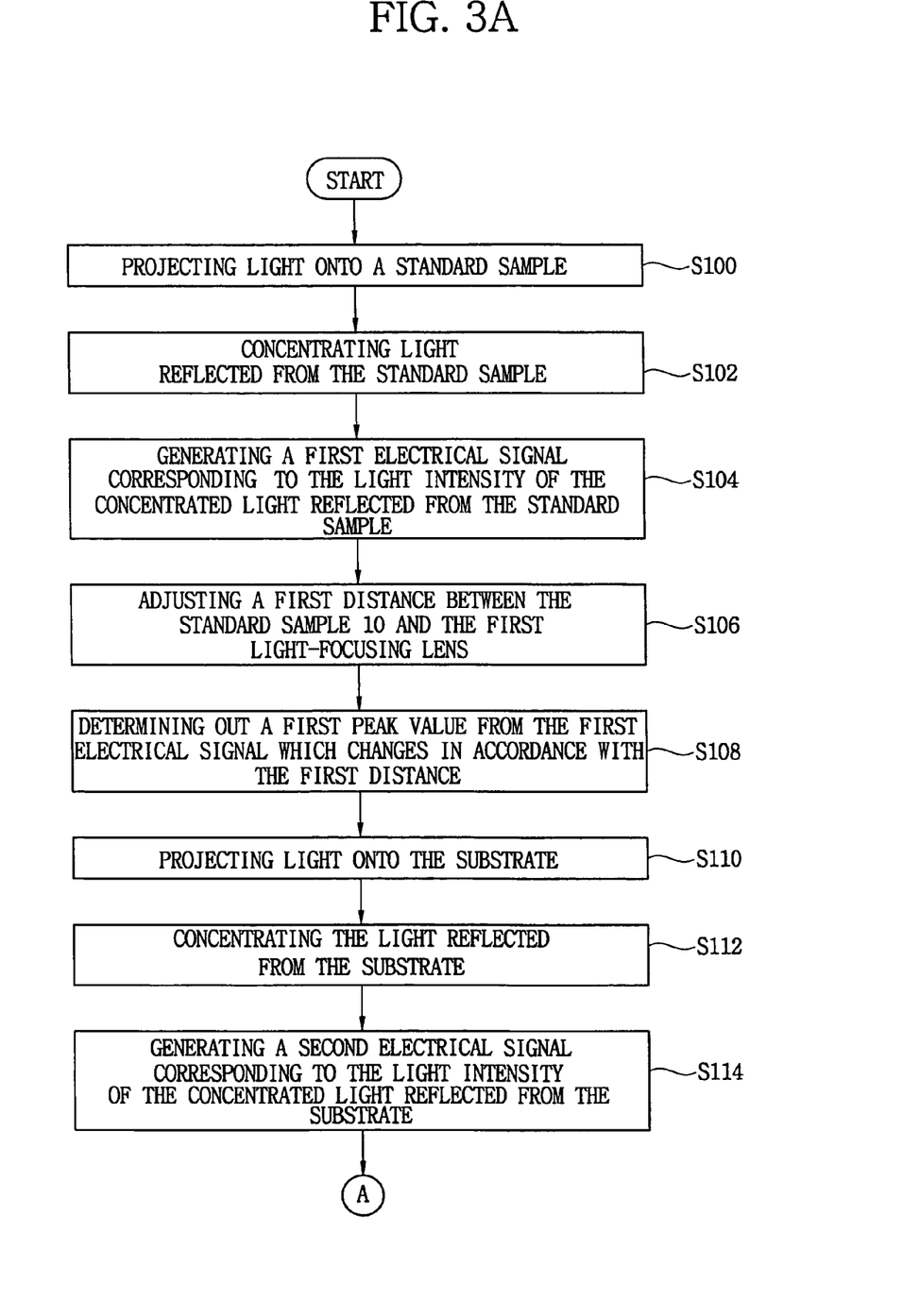
FIGS. 3A and 3B are flow charts for showing a method of measuring the substrate thickness.
Figure 3B:
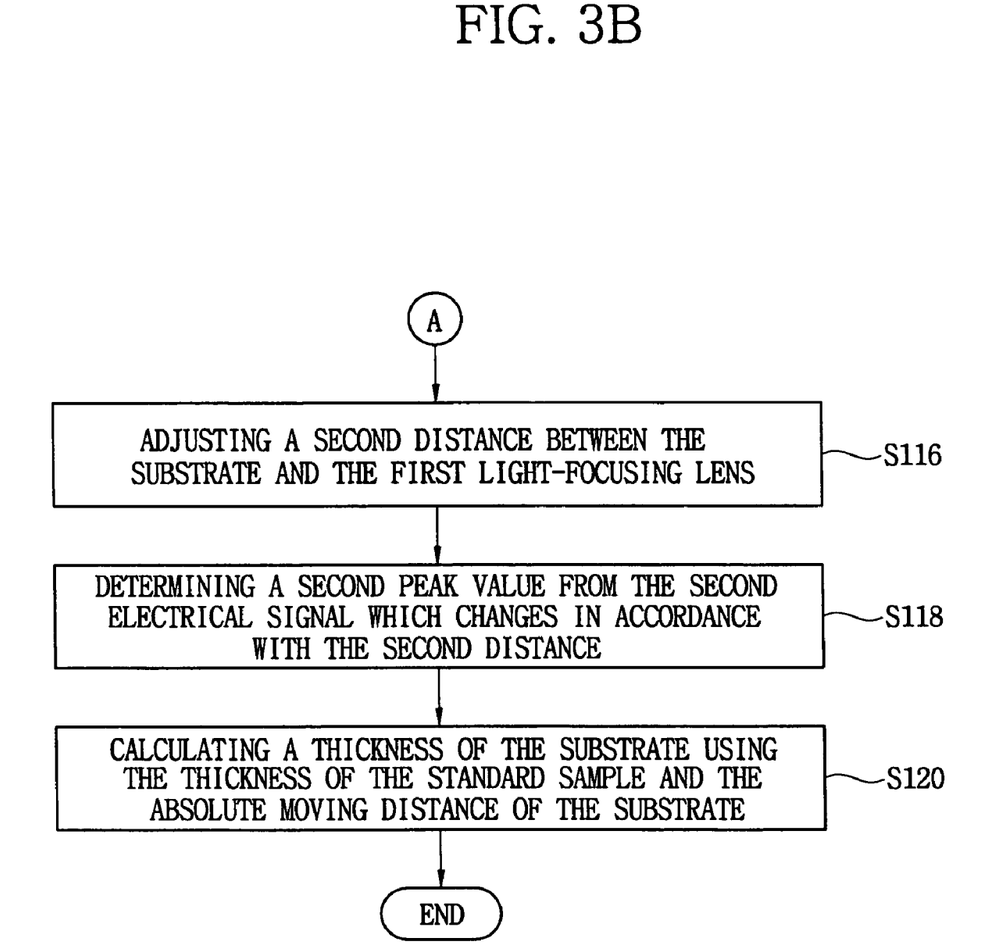

Example FIGS. 3A and 3B are flow charts for showing a method of measuring substrate thickness, referring to the measuring apparatus illustrated in example FIG. 1. Example FIGS. 4A to 4F are plan views for explaining each steps of the method of measuring the substrate thickness. Example FIG. 5 is a view illustrating a standard distance and a moving distance.

Figure 5:
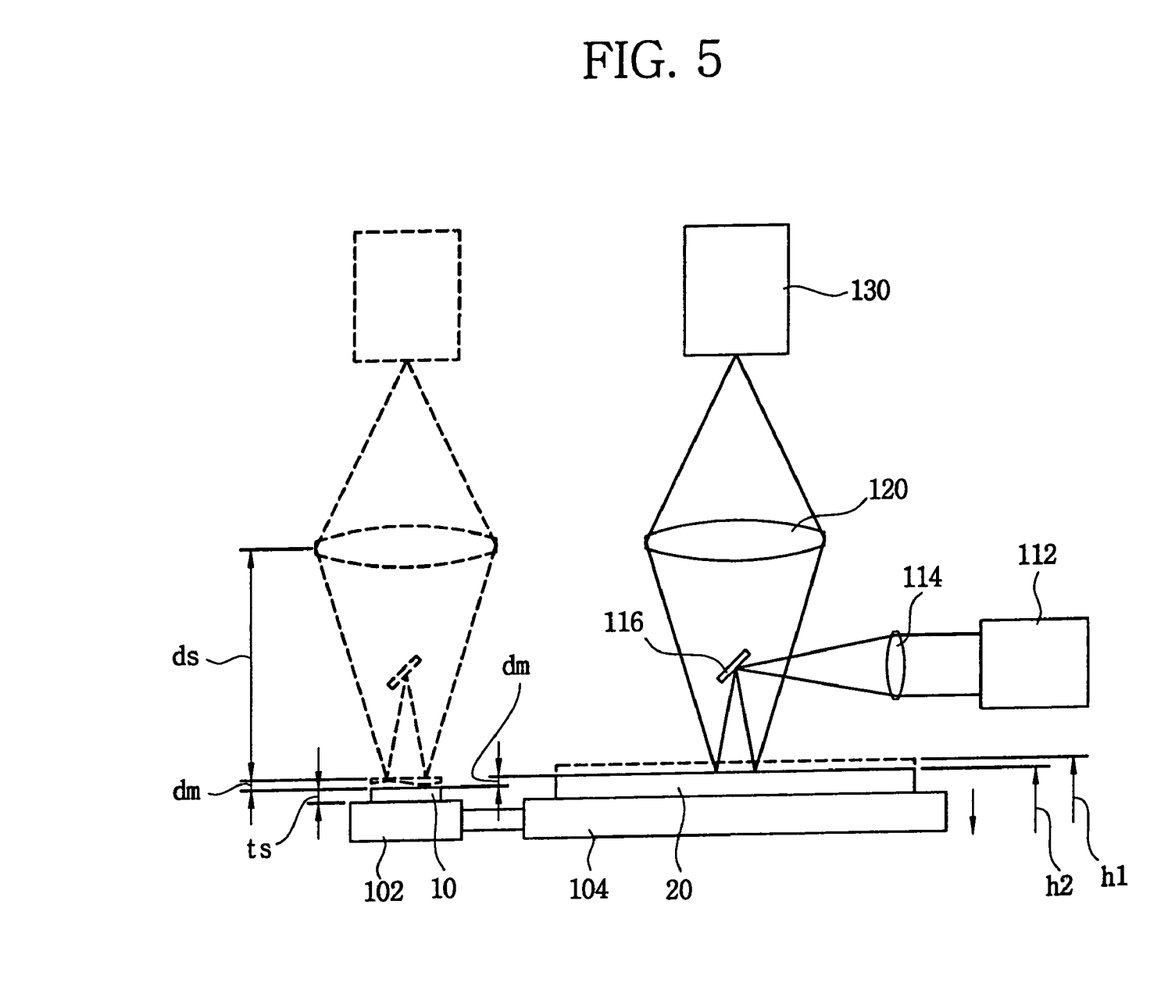
FIG. 5 is a view for illustrating a standard distance and a moving distance.

Referring to example FIGS. 3 to 5, in step S100 light is projected onto to the standard sample 10 with a known thickness. The standard sample 10 is supported on the sample stage 102 along the horizontal direction, and the light is projected onto the upper surface of the standard sample 10 from the lighting unit 110. In step S102, the light is reflected from the upper surface of the standard sample 10. The light reflected from the standard sample 10 is concentrated onto a surface of the detector 130 through the first light-focusing lens 120.

Figure 4A:
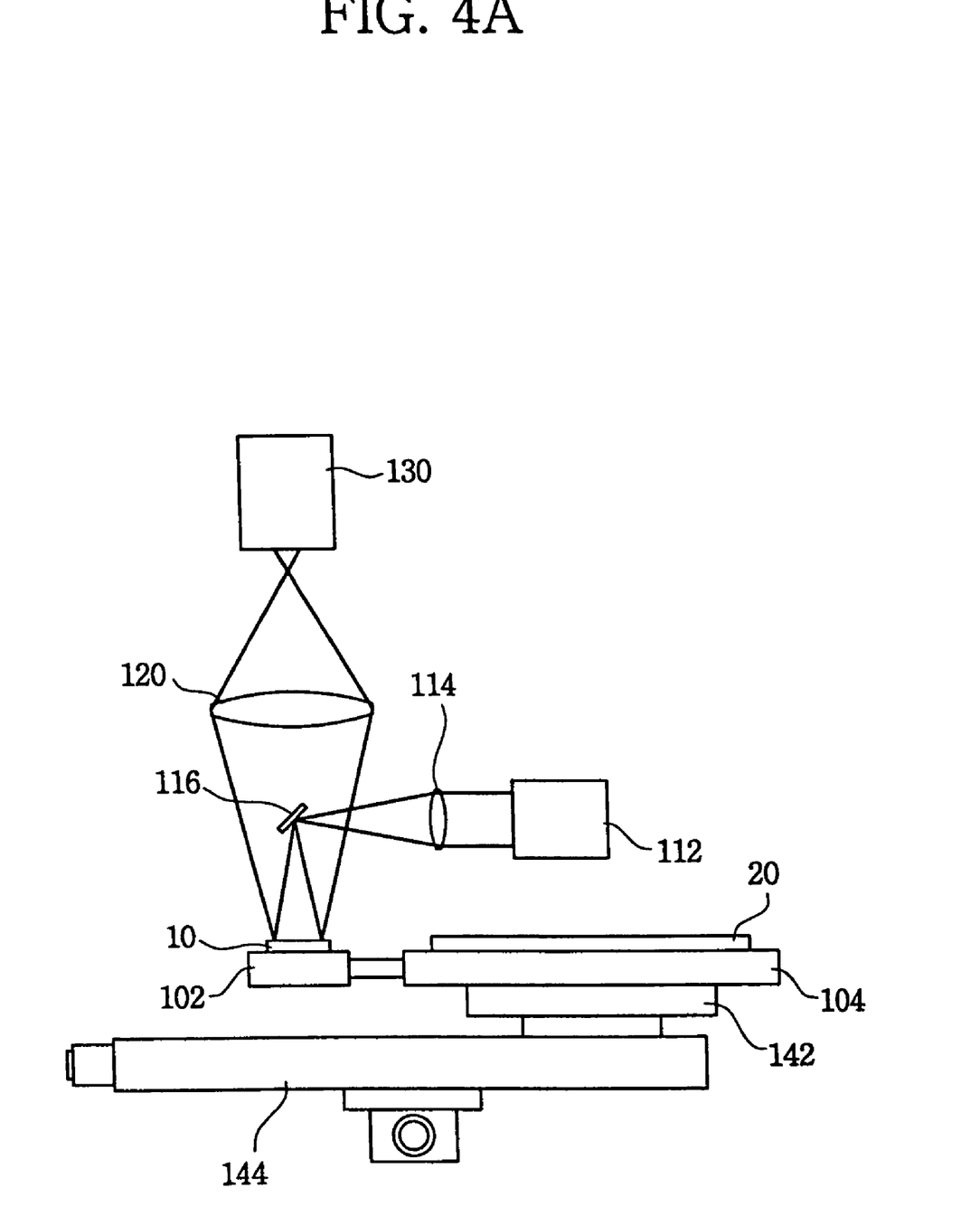
FIGS. 4A to 4F are plan views for explaining steps of a method of measuring substrate thickness.
Figure 4B:
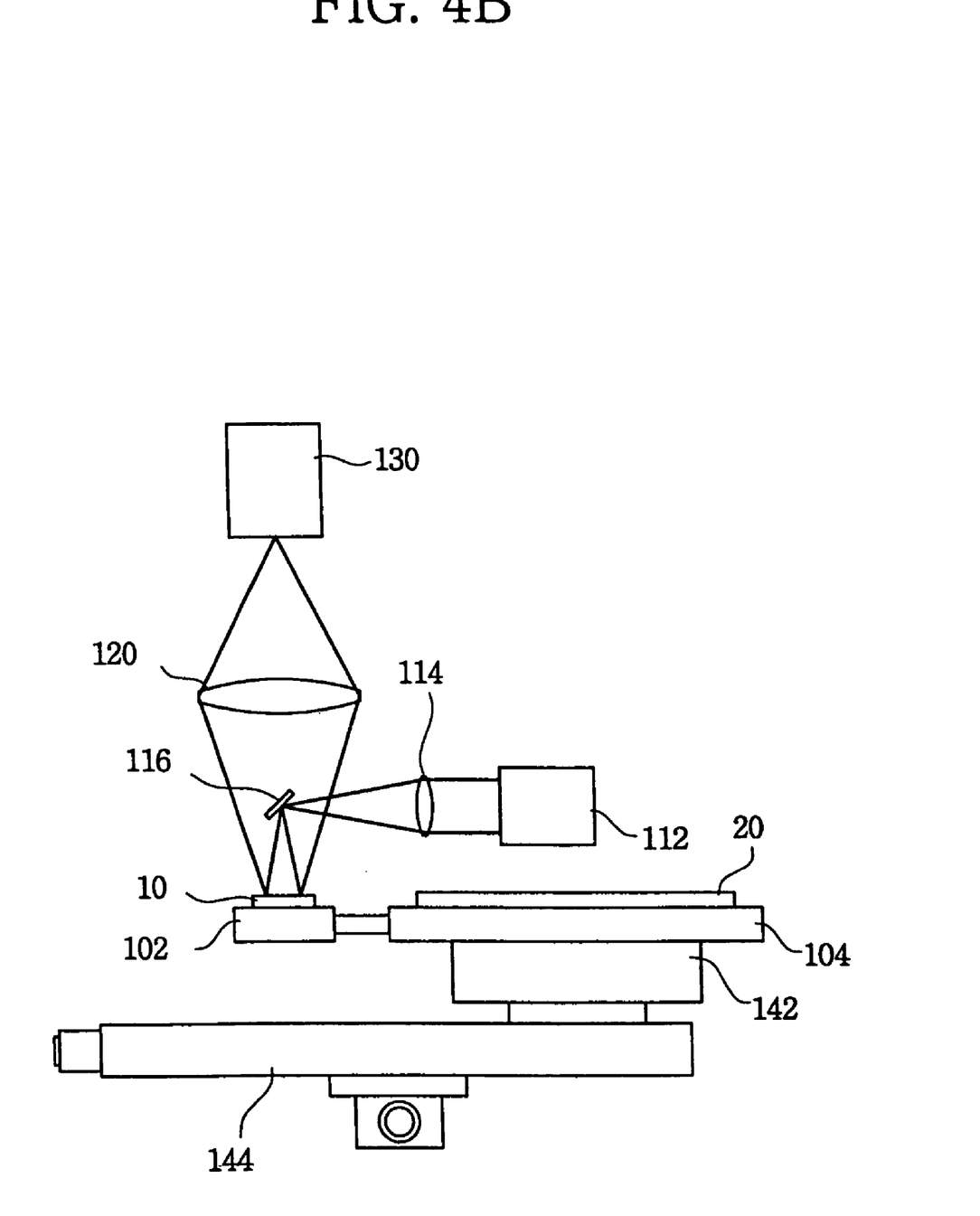

In step S104, a first electrical signal is generated corresponding to the light intensity of the concentrated light from the first light-focusing lens 120. The detector detects the concentrated light and generates the first electrical signal corresponding to the light intensity of the concentrated light. In step S106, a first distance between the standard sample 10 and the first light-focusing lens 120 is adjusted. The first driver 142 vertically moves the sample stage 102 upwards or downwards to adjust the first distance.

In step S108, a first peak value is determined from changes in the first electrical signal responsive to changes in the first distance. The operating unit 150 analyzes the variation of the first electrical signal and determines the first peak value of the first electrical signal. The operating unit 150 calculates the standard distance (ds) corresponding to the first peak value between the standard sample 10 and the first light-focusing lens 120 by using the known thickness of the standard sample 10 and the moving distance along which the standard sample 10 passed in step S106. The first peak value is determined only when the light reflected from the standard sample 10 is concentrated on the surface of the detector 130.

Figure 4C:
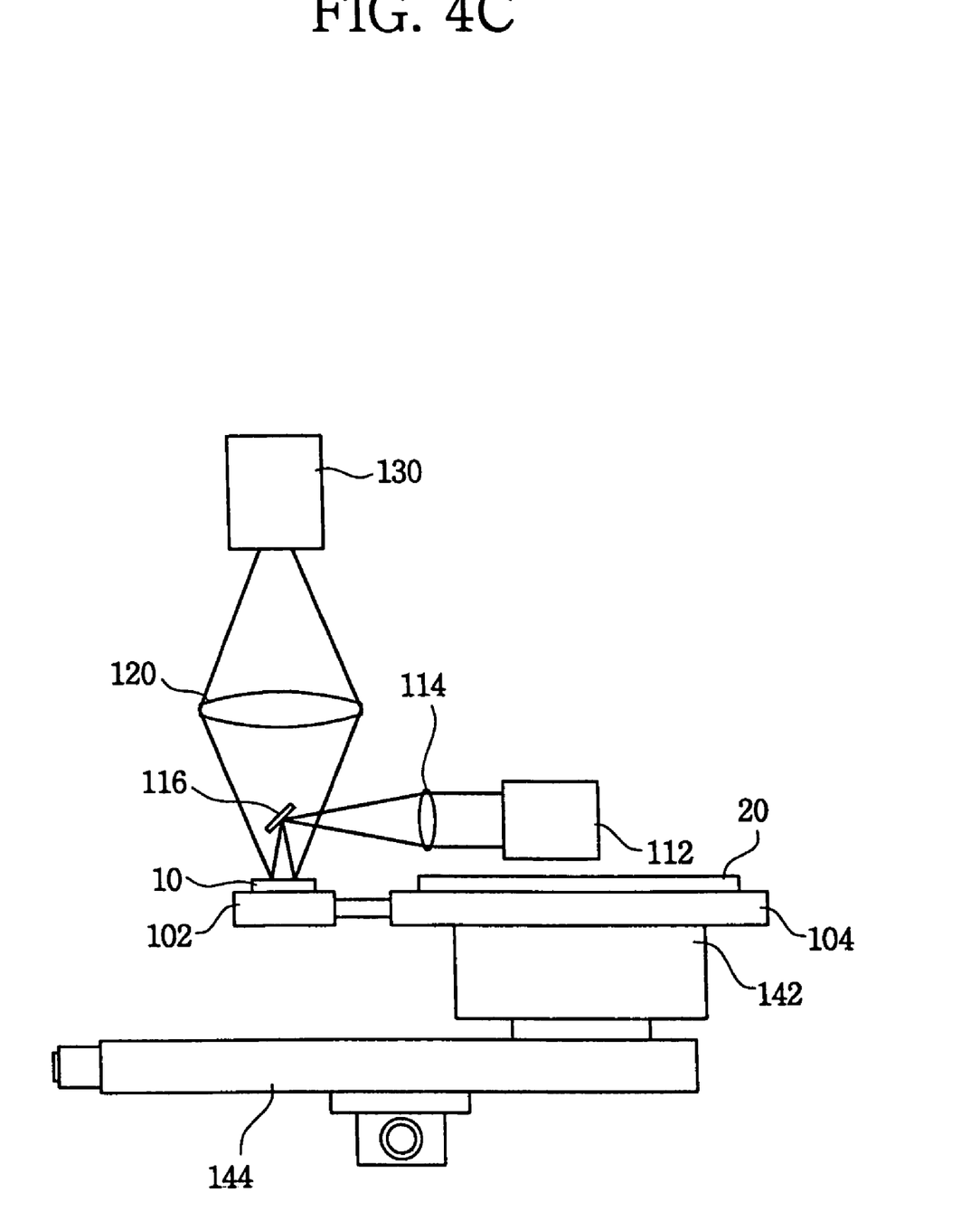

In step S110, light is projected onto the substrate 20. The second driver 144 moves the substrate stage 104 along the horizontal direction, so that the upper surface of the substrate 20 is exposed to light from the lighting unit 110. Then, the lighting unit 110 projects light onto a local portion of the upper surface of the substrate 20. The local portion of the upper surface of the substrate 20 is selected by controlling the second driver 144.

Figure 4D:
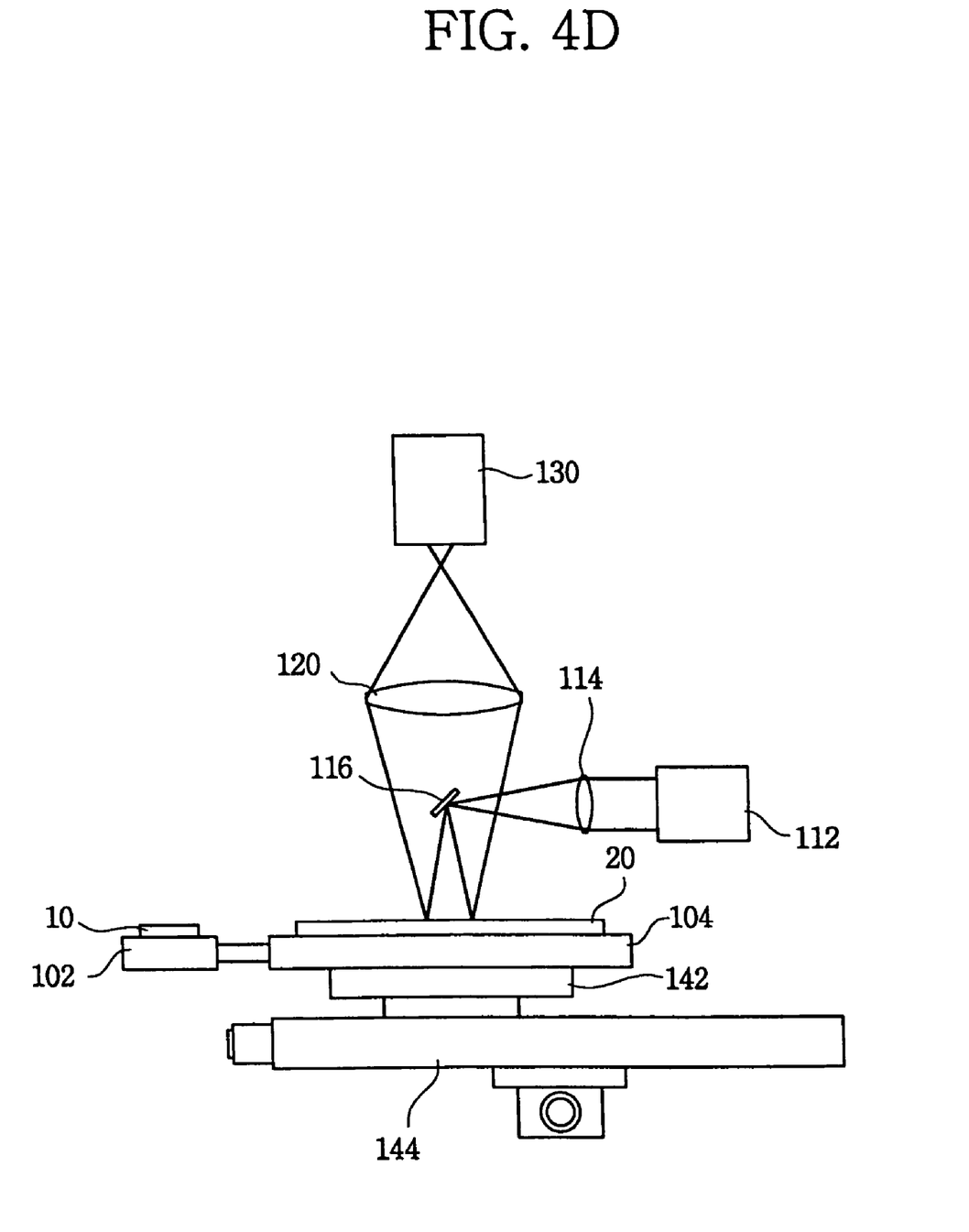

In step S112, the light reflected from the substrate 20 is concentrated onto the detector 130. The light reflected from portion 20a of the substrate 20 is concentrated through the first light-focusing lens 120. In step S114, a second electrical signal is generated corresponding to the light intensity of the concentrated light reflected from the substrate 20. The detector 130 detects the concentrated light reflected from the substrate 20. The concentrated light is then converted into the second electrical signal.

Figure 4E:
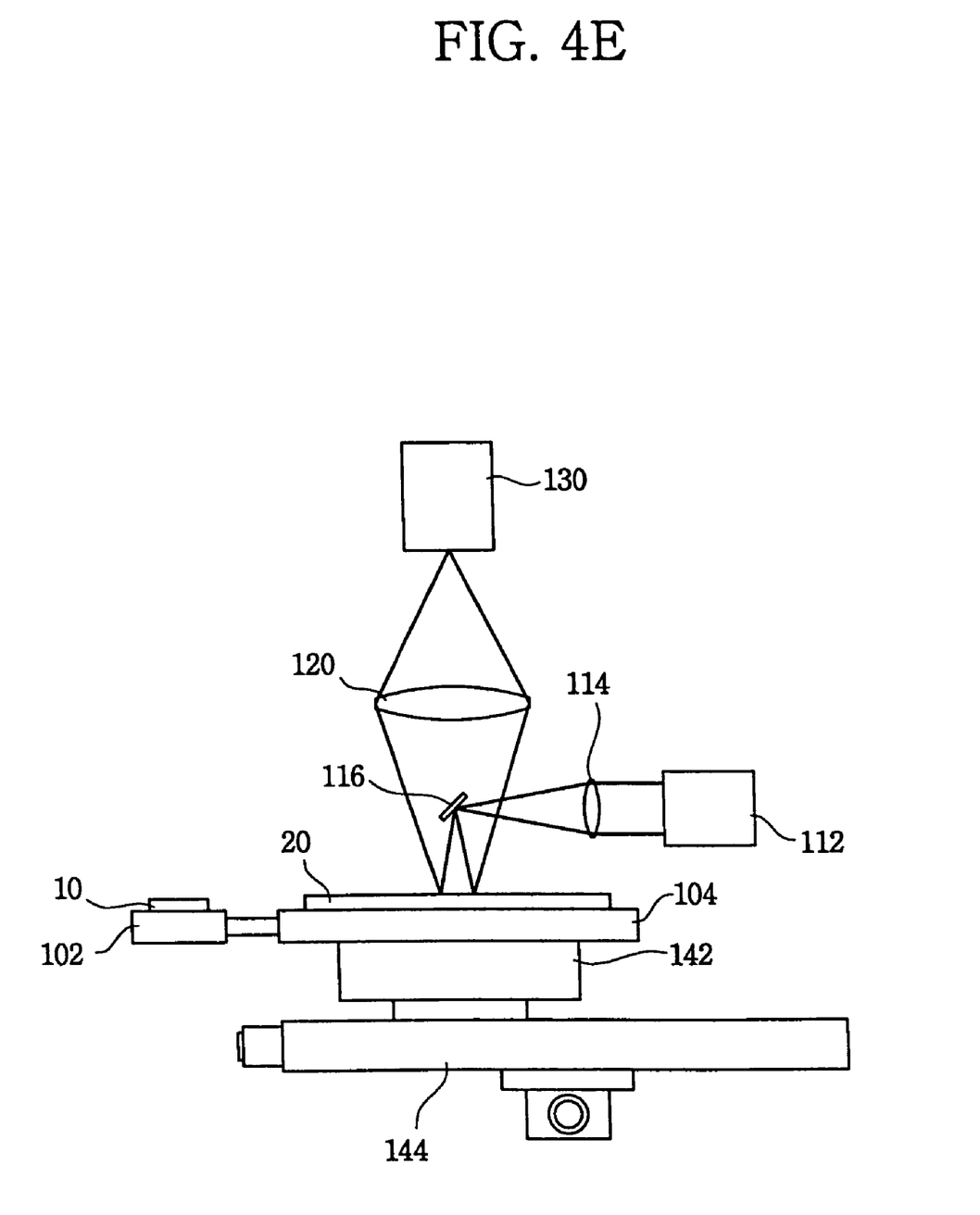

In step S116, a second distance is adjusted between the substrate 20 and the first light-focusing lens 120. The first driver 142 vertically moves the substrate stage 102 upwards or downwards to adjust the second distance. In step S118, a second peak value is determined from changes in the second electrical signal in accordance with changes of the second distance. The second peak value is determined only when the light reflected from the substrate 20 is concentrated on the surface of the detector 130. The operating unit 150 determines the second peak value of the first electrical signal and calculates the moving distance (dm) corresponding to the second peak value. The moving distance (dm) is an absolute distance along which the substrate 20 passes from a first height (h1) which corresponds to the standard distance (ds) to a second height (h2) that corresponds to the second peak value.

Figure 4F:
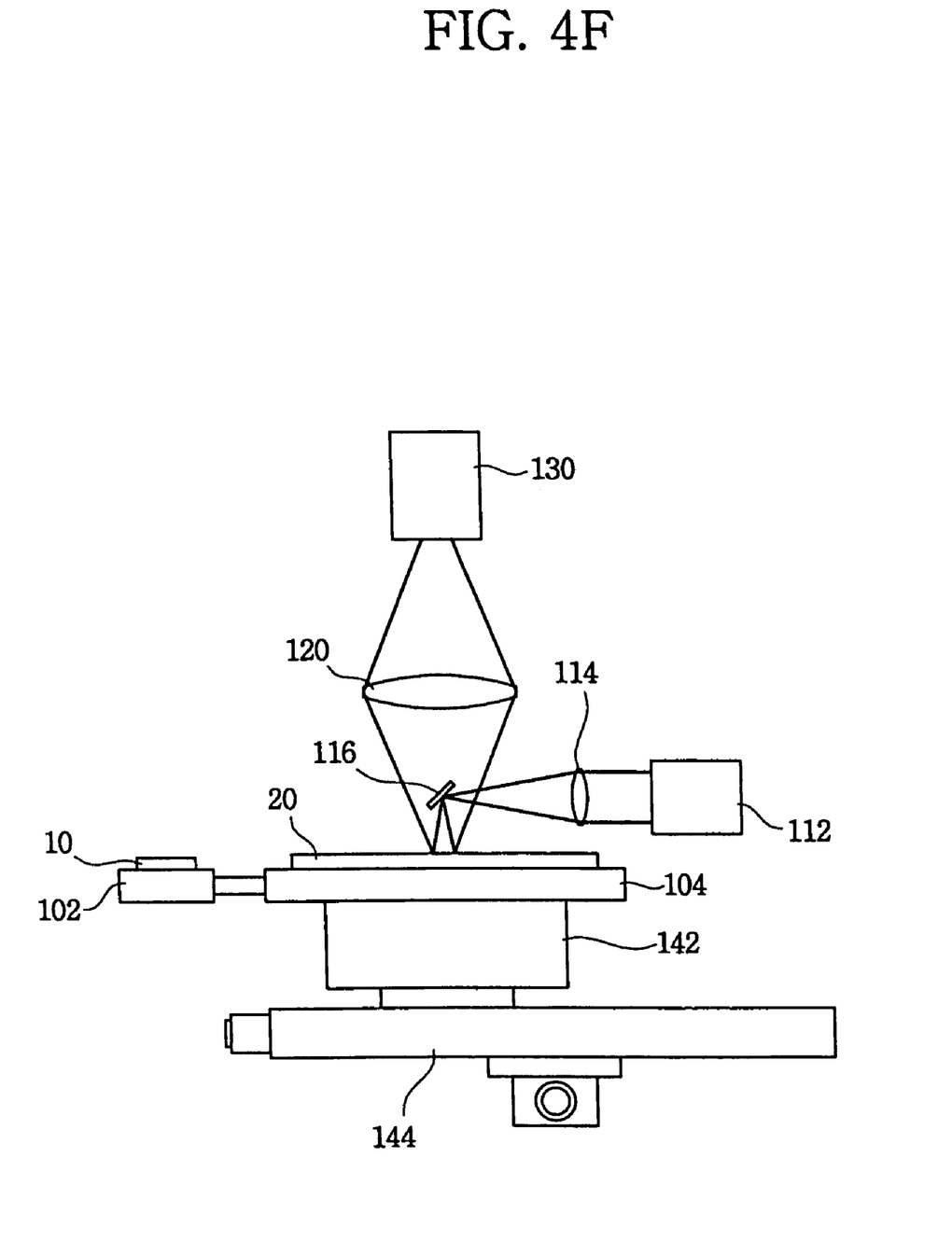

In step S120, the thickness of the substrate 20 is calculated using the thickness (ts) of the standard sample 10 and the absolute moving distance (dm) of the substrate 20. Since the standard distance corresponding to the first peak value is substantially identical to the second distance corresponding to the second peak value, the absolute moving distance of the substrate 20 is substantially identical to the difference between the thickness of the standard sample 10 and the thickness of the substrate 20. Therefore, the operating unit 150 may calculate the thickness of the substrate 20 using the thickness (ts) of the standard sample 10 and the absolute moving distance (dm) of the substrate 10.

Figure 6:
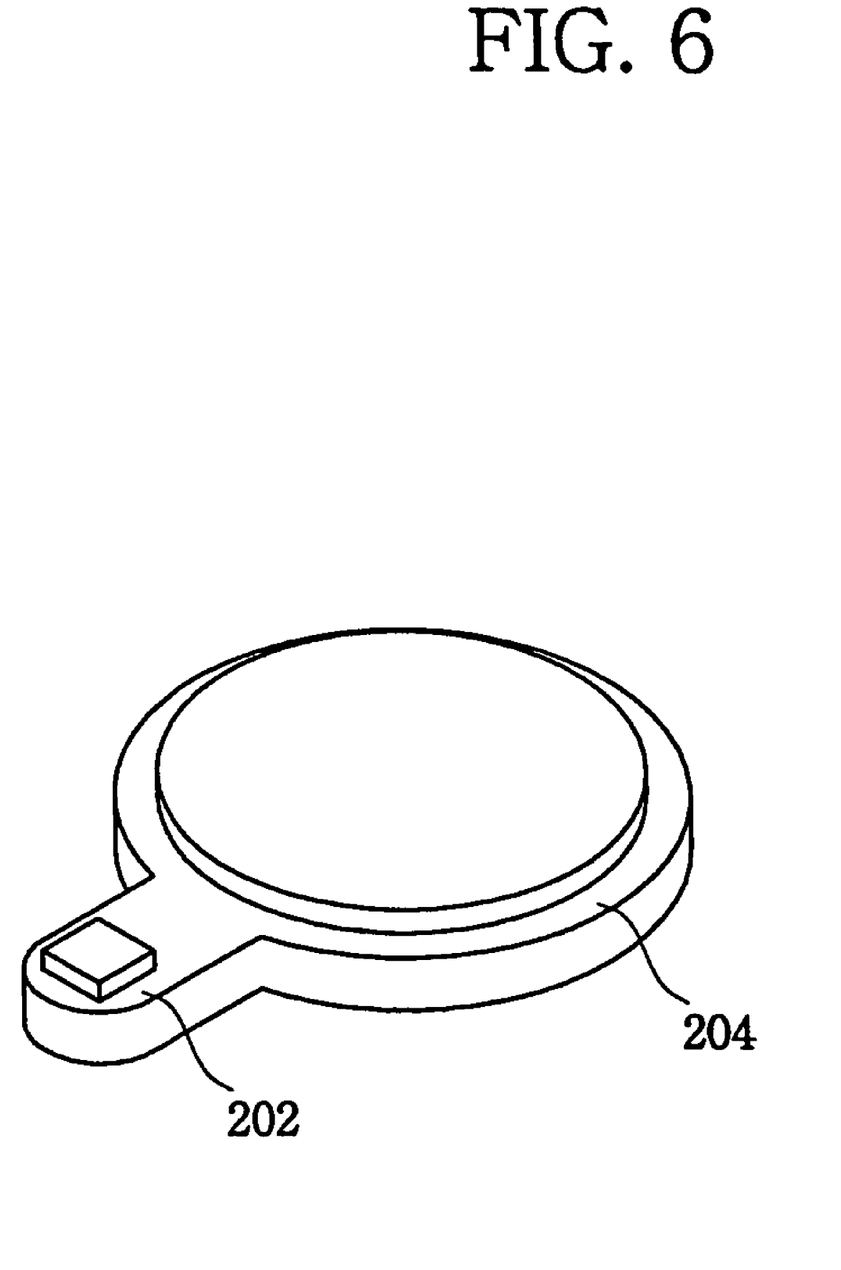
FIG. 6 is a perspective view illustrating a sample stage.

Example FIG. 6 is a perspective view illustrating the sample stage and the substrate stage according to embodiments of the present invention. The sample stage 202 for supporting the standard sample and the substrate stage 204 for supporting the substrate are integrally formed. The function of the sample and substrate stages 202 and 204 are similar to the embodiments described with reference to example FIGS. 1 and 2.

According to embodiments of the invention, the thickness of the semiconductor substrate may be obtained with ease, promptitude and accuracy by using the standard distance (corresponding to the first peak value), the moving distance of the substrate (corresponding to the second peak value), and the known thickness of the standard sample 10.

Although example embodiments of the present invention have been described, it is understood that the present invention should not be limited to these example embodiments, but various changes and modifications can be made by one skilled in the art without departing from the spirit and scope of the present invention as hereinafter claimed.

What is claimed is:

1. An apparatus which measures the thickness of a substrate, comprising:
   a sample stage, wherein the sample stage includes a first upper surface for supporting a standard sample of a known thickness;
   a substrate stage which supports a substrate, wherein the substrate stage includes a second upper surface positioned at substantially the same height as the first upper surface of the sample stage;
   a lighting unit which selectively projects light to the standard sample on the sample stage or to the substrate on the substrate stage;
   a first light-focusing lens which concentrates light reflected from the standard sample and light reflected from the substrate, wherein the first light-focusing lens includes a first light axis substantially perpendicular to the first upper surface and the second upper surface;
   a detector which detects the concentrated light reflected from the standard sample and the concentrated light reflected from the substrate through the first light-focusing lens, wherein the detector converts the light intensity of the concentrated light reflected from the standard sample and the concentrated light reflected from the substrate into a first electrical signal and a second electrical signal, respectively;

a driving unit for moving the substrate stage and the sample stage, wherein:
    the driving unit moves the substrate stage and the sample stage so that light exiting from the lighting unit is selectively projected to the standard sample or to the substrate; and
    the driving unit moves the substrate stage and the sample stage to adjust a first distance between the standard sample and the first light-focusing lens and adjust a second distance between the substrate and the light-focusing lens; and
an operating unit which determines a first peak value from the first electrical signal that changes in accordance with changes in the first distance and a second peak value from the second electrical signal that changes in accordance with changes in the second distance, wherein the operating unit calculates the thickness of the substrate by using a standard distance corresponding to the first peak value between the standard sample and the first light-focusing lens, a moving distance of the substrate corresponding to the second peak value, and the known thickness of the standard sample.

2. The apparatus of claim 1, wherein:
the sample stage is coupled to a sidewall of the substrate stage; and
the driving unit is connected to a lower portion of the substrate stage.

3. The apparatus of claim 1, wherein the sample stage and the substrate stage are integrally formed with each other.

4. The apparatus of claim 2, wherein the lighting unit comprises:
a light source which generates light;
a second light-focusing lens which concentrates the light generated from the light source, wherein the second light-focusing lens has a second light axis substantially perpendicular to the first light axis; and
a reflection mirror disposed at the intersection of the first light axis and second light axis, wherein the reflection mirror projects light concentrated through the second light-focusing lens to a horizontal surface including the first and second upper surfaces, at substantially right angles.

5. The apparatus of claim 4, wherein a portion of the light concentrated through the second light-focusing lens is reflected from the reflection mirror, and the remaining portion of the light concentrated through the second light-focusing lens is transmitted through the reflection mirror.

6. The apparatus of claim 4, wherein the reflection mirror is disposed between the horizontal surface and the first light-focusing lens.

7. The apparatus of claim 4, wherein the reflection mirror is disposed between the detector and the first light-focusing lens, and light reflected from the reflection mirror is projected onto the standard sample on the sample stage or the substrate supported on the substrate stage through the first light-focusing lens.

8. The apparatus of claim 1, wherein the driving unit comprises:
a first driver for moving the sample stage and the substrate stage vertically; and
a second driver for moving the sample stage and the substrate stage horizontally.

9. The apparatus of claim 8, wherein the first driver comprises a piezoelectric stack.

10. The apparatus of claim 8, wherein the second driver comprises a two dimensional Cartesian robot.

11. The apparatus of claim 1, wherein the substrate comprises a bare silicon wafer.

12. A method of measuring a thickness of a substrate, comprising:
projecting light to a standard sample of a known thickness;
concentrating light reflected from the standard sample trough a light-focusing lens;
generating a first electrical signal corresponding to the light intensity of the light reflected from the standard sample;
adjusting a first distance between the standard sample and the light-focusing lens;
determining a first peak value from the first electrical signal which changes in accordance with changes of the first distance;
projecting a second light onto a substrate;
concentrating light reflected from the substrate through the light-focusing lens;
generating a second electrical signal corresponding to the light intensity of the reflected second light;
adjusting a second distance between the substrate and the light-focusing lens;
determining a second peak value from the second electrical signal which changes in accordance with changes of the second distance; and
calculating the thickness of the substrate by using a standard distance corresponding to the first peak value between the standard sample and the light-focusing lens, a moving distance of the substrate corresponding to the second peak value, and a thickness of the standard sample.

13. The method of claim 12, wherein the light reflected from the standard sample and the light reflected from the substrate are projected at substantially right angles onto the standard sample and the substrate.

14. The method of claim 12, wherein the generating the first electrical signal comprises:
detecting concentrated light reflected from the standard sample through the light-focusing lens; and
converting the concentrated light reflected from the standard sample into the first electrical signal.

15. The method of claim 12, wherein the generating the second electrical signal comprises:
detecting concentrated light reflected from the substrate through the light-focusing lens; and
converting the concentrated light reflected from the substrate into the second electrical signal.

16. A method for determining the thickness of a tested semiconductor substrate comprising:
projecting light onto a sample semiconductor substrate having a known thickness;
adjusting the distance between the sample semiconductor substrate and a light detector to maximize the intensity of light received by a light detector;
projecting light onto a tested semiconductor substrate;
adjusting the distance between the tested semiconductor substrate and the light detector to maximize the intensity of light received by the light detector; and
calculating the thickness of the tested semiconductor substrate based on the sum of the known thickness of the sample semiconductor substrate and the distance the tested semiconductor substrate moved toward or away from the detector during said adjusting the distance between the tested semiconductor substrate and the detector.

17. The method of claim 16, wherein a surface that the sample semiconductor substrate is disposed on and a surface that the tested semiconductor substrate is disposed on are in the same spatial plane.

18. The method of claim 17, comprising maintaining the surface that the sample semiconductor substrate is disposed on and the surface that the tested semiconductor substrate is disposed on in the same spatial plane, wherein said maintaining is after said adjusting the distance between the sample semiconductor substrate and a light detector and before said projecting light onto the tested semiconductor substrate.

19. The method of claim 17, wherein the surface that the sample semiconductor substrate is disposed on and the surface that the tested semiconductor substrate is disposed are the same surface.

* * * * *